United States Patent

Levy et al.

[11] Patent Number: 5,852,356
[45] Date of Patent: Dec. 22, 1998

[54] DC/AC INVERTER FOR POWER SUPPLY TO AN ELECTRICAL MOTOR FOR THE TRACTION OF A VEHICLE

[75] Inventors: Alain Levy, Gif sur Yvette, France; Ernst Schimanek, Nuremberg; Wolfram Dietze, Schwabach, both of Germany

[73] Assignees: Thomson-CSF, Paris, France; Semikron International, Nuremberg, Germany

[21] Appl. No.: 789,538

[22] Filed: Jan. 27, 1997

[30] Foreign Application Priority Data

Jan. 30, 1996 [FR] France .................................... 96 01058

[51] Int. Cl.$^6$ ....................................................... H02P 1/46
[52] U.S. Cl. .......................... 318/719; 318/439; 318/138; 318/254; 318/798
[58] Field of Search ..................................... 318/439, 138, 318/254, 798, 799, 800, 803, 719

[56] References Cited

U.S. PATENT DOCUMENTS 4,694,386  9/1987  De Sartre .................................... 363/49
5,517,095  5/1996  Carobolante et al. .................. 318/254

FOREIGN PATENT DOCUMENTS

| 59-198881 | 11/1984 | Japan . |
| 64-64504 | 3/1989 | Japan . |
| 4-210797 | 7/1992 | Japan . |
| 5-184182 | 7/1993 | Japan . |
| 8-84500 | 3/1996 | Japan . |

*Primary Examiner*—William M. Shoop, Jr.
*Assistant Examiner*—Kim Lockett
*Attorney, Agent, or Firm*—Oblon, Spivak, McClelland, Maier & Neustadt, P.C.

[57] ABSTRACT

Disclosed is a dc/ac inverter for the supply of alternating current to the windings of a synchronous electrical motor, especially for the traction of an electrical vehicle. During each half-wave of the alternating current, the dc/ac inverter with solid-state switches delivers steady levels of constant intensity. During each steady level, the intensity of the current is determined by the cyclical ratio of a chopping signal that controls the conduction of the transistor-based or thyristor-based switches. At zero speed of the rotor, the frequency f of the chopping signal has a value (f', 1 khz) smaller than the chopping frequency (8 kHz) for a speed different from zero. Thus the starting losses or the losses with the rotor off are minimized.

16 Claims, 3 Drawing Sheets

DC/AC INVERTER FOR POWER SUPPLY TO AN ELECTRICAL MOTOR FOR THE TRACTION OF A VEHICLE

BACKGROUND OF THE INVENTION

1. Field of the Invention

The invention pertains to a dc/ac inverter for the supply of power to an electrical traction motor especially for vehicles.

It relates more particularly to a system for the traction of an electrical vehicle comprising a permanent-magnet rotor or slip-ring (or wound) rotor type of synchronous motor and a wound stator for the generation, when it is supplied with electrical energy, of a rotating magnetic field that prompts the rotation of the rotor.

2. Description of the Prior Art

The windings of the stator are supplied by a dc/ac inverter which generally draws its energy from a battery of accumulators.

A dc/ac inverter has a number of pairs of controlled switches equal to the number of windings, or phases, contained in the wound stator. In the most common example, the stator of the synchronous motor is a three-phase stator. The dc/ac inverter therefore has three pairs of controlled switches, for example transistors or thyristors. Hereinafter, we shall consider only the example of the three-phase stator and the transistor-based dc/ac inverter.

Each pair of transistors is assigned to one phase of the stator. In one of these pairs, a transistor enables the flow of current in a determined direction in the corresponding phase and the other transistor enables the current to flow in the opposite direction in the same phase. Naturally, during operation, only one of the two transistors of a pair is conductive at a time. The transistors are controlled in such a way that each phase is supplied by an alternating signal and these alternating signals are phase-shifted by 120° with respect to one another in such a way as to generate the rotating field.

The control enables the synchronous motor to be self-driven, namely the frequency of the alternating signal is matched with the speed of the rotor in order to retain the synchronism between the rotating field and the rotor. To this end, a sensor linked to the rotor gives an indication of the angular position at the rotor at each instant. The signal given by the sensor is used to control the transistors and, especially, to adjust the frequency of the alternating signals.

Each half-wave of the alternating signal is formed by a specific number of steady levels of generally equal duration, with a steady level corresponding to a current of constant intensity. In general, the number of steady levels per half-wave is equal to the number of phases of the stator.

The phases of the winding of the stator are practically identical to one another. Similarly, the transistors all have substantially the same characteristics.

To obtain the necessary modulation of the intensities (in order to generate the alternating currents), the conduction of each transistor is controlled by a pulse width modulation (PWM). This modulation consists in interrupting or chopping the conduction of each transistor at a high frequency, for example 8 kHz, the mean intensity being determined by the cyclical ratio, namely the ratio between, on the one hand, the duration t of conduction of the transistor during a period T of the high frequency signal and, secondly, this period T. The greater the cyclical ratio, the higher is the mean intensity. In one example, the cyclical ratio varies between 0 and ½.

The intensity of the current in one phase is equal to the sum of the intensities of the currents flowing in the opposite direction in the other two phases.

In normal operation, when the motor rotates at high speed, the loads of the six transistors are distributed uniformly in the course of time.

By contrast, when the windings or phases of the stator are supplied but the rotor does not rotate, especially when starting up or because of an interruption, these phases are supplied in a particular sequence determined by the relative position of the rotor with respect to the stator. In one example, three of the six transistors are conductive and one of these three transistors is crossed by a current with an intensity that is twice that of the current flowing through each of the other two transistors. In another example, two of the six transistors are conductive.

Thus, at least one transistor is subjected to an excess load, namely it is crossed by a maximum mean current for a period of time greater than that in which it is crossed by the same current during the normal operation of the motor.

To take account of this situation, two approaches have been provided up till now. In the first approach, the transistors of the dc/ac inverter are sized sufficiently so as not to bring about a deterioration in the characteristics of the motor, especially so as to retain a torque of substantial value at low speed. In the second approach, the transistors are sized for the steady state of rotation and, in this case, the torque at low speed (when starting up) has a reduced value which may prove to be insufficient.

The first approach is costly while the second approach is not satisfactory for the working of the motor.

SUMMARY OF THE INVENTION

The invention overcomes these drawbacks. It is based on the observation that the losses in a transistor (and more generally in a solid-state switch) depend not only on the intensity of the current flowing through the transistor but also on the chopping frequency. These losses are called commutation losses.

The invention is characterized by the fact that means are provided so that, when the rotation speed of the rotor is zero, the chopping (or commutation) frequency is lower than the pulse width modulation chopping frequency for a rotor speed that is different from zero.

Preferably, the chopping frequency when starting up is chosen so that the losses in the corresponding transistors are, during this starting-up stage, equal to the maximum losses in the same transistors in steady operation.

BRIEF DESCRIPTION OF THE DRAWINGS

The invention will be understood more clearly and other features and other advantages shall appear from the following description of certain embodiments, described with reference to the appended drawings, of which.

MORE DETAILED DESCRIPTION

Figure 1:
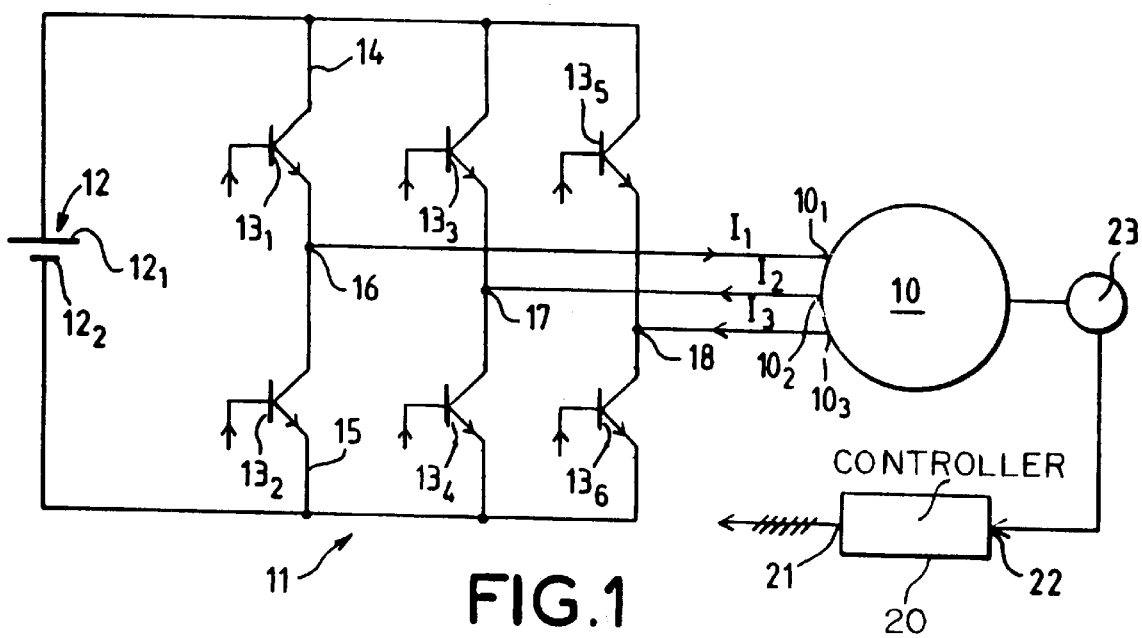
FIG. 1 is a drawing showing the principle of a dc/ac inverter and the motor.

In FIG. 1, the motor 10 is a synchronous motor, namely a motor whose rotor comprises one or more permanent magnets or a winding and whose stator has a three-phase winding for which each phase is supplied by an alternating current. In these phases, the currents have a phase shift of 120° with respect to one another. Hereinafter, a description shall be given of a permanent-magnet rotor type of synchronous motor.

The well-known principle of operation of a synchronous motor of this kind is recalled here: the currents in the phases of the stator generate a rotating electrical field that causes the rotation of the magnets of the rotor and hence the rotation of the motor. The speed of rotation of this motor depends on the frequency of supply of the phases of the stator.

These phases of the stator of the motor 10 are supplied by a dc/ac inverter 11 which is itself supplied by a battery of accumulators 12.

The dc/ac inverter 11 has three pairs of transistors, respectively $13_1$, $13_2$; $13_3$, $13_4$; $13_5$, $13_6$. In each pair, for example the transistors $13_1$ and $13_2$, these elements are series-mounted and connected in the same direction. The collector 14 of the transistor $13_1$ is connected to the positive terminal $12_1$, of the battery 12 while the emitter 15 of the transistor $13_2$ is connected to the negative terminal $12_2$ of the battery 12. The pairs of transistors $13_3$, $13_4$ as well as $13_5$, $13_6$ are connected in an identical manner to the terminals of the battery 12.

The terminal 16 common to the emitter of the transistor $13_1$ and to the collector of the transistor $13_2$ is connected to the input 101 of the first phase of the stator of the motor 10. Similarly, the terminal 17 common to the transistors $13_3$ and $13_4$ is connected to the input $10_2$ of the second phase of the stator of the motor 10 and the terminal 18 common to the transistors $13_5$ and $13_6$ is connected to the input $10_3$ of the third phase of the stator of the motor 10.

The conduction of the various transistors of the inverted rectifier 11 is controlled by a device 20 having parallel outputs 21, each of which is associated with the base of one of the transistors. This device 20 has an input 22 receiving a signal from a sensor 23 providing a piece of information on the position of the rotor of the motor 10 with respect to the stator.

Figure 2A:
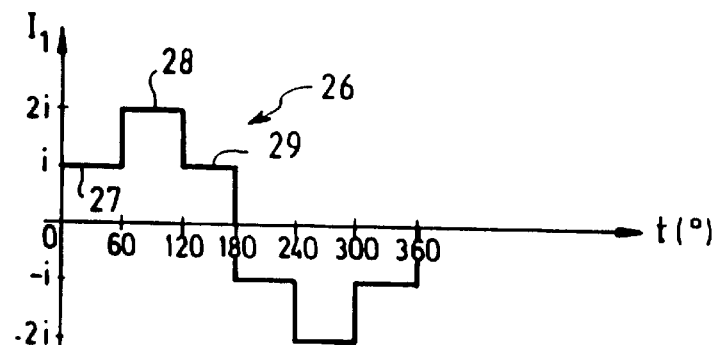
FIGS. 2a, 2b and 2c are graphs showing the intensities of currents in each phase of the stator of the motor in FIG. 1, FIGS. 3a, 3b and 3c are graphs similar to those of FIGS. 2a, 2b and 2c but pertain to a variant.
Figure 2B:
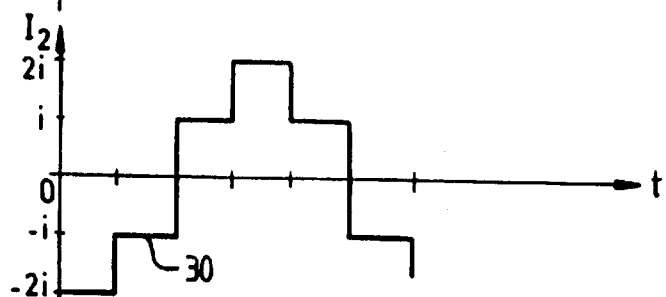
Figure 2C:
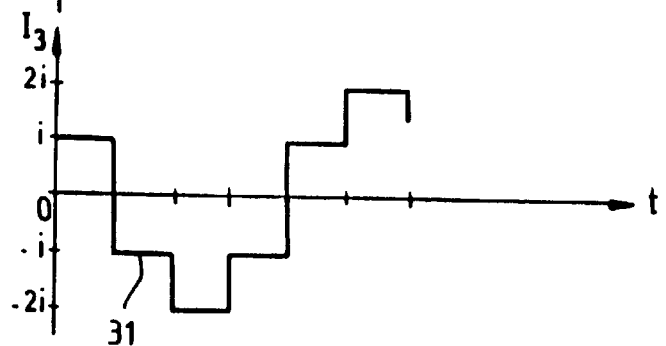

The conduction of the transistors of the inverted rectifier 11 is controlled as shown in FIGS. 2a, 2b and 2c in which:

FIG. 2a shows the intensity $I_1$ of the electrical current in the first phase of the stator of the motor 10, FIG. 2b shows the intensity $I_2$ of the current in the second phase of the motor 10 and FIG. 2c shows the intensity $I_3$ of the current in the third phase of this motor.

Each of these currents $I_1$, $I_2$ and $I_3$ is an alternating current. All three of them have the same frequency and are phase-shifted by 120° with respect to one another. Thus, the current $I_2$ has a phase-shift of 120° with respect to the current $I_1$ and the current $I_3$ has a phase-shift of 120° with respect to the current $I_2$. Each half-wave is formed by three steady levels. Thus, the first positive half-wave 26 of the current $I_1$ is formed by a first steady level 27 with an intensity i between the instants 0 and 60°, a second steady level 28 with an intensity 2i between the instants 60° and 120°, and a third steady level 29 with an intensity i between the instants 120° and 180°. Then, for the next negative half-wave, $I_1$ has three steady levels with intensities –i, –2i and –i respectively.

It can be seen that, in each sequence with a duration of 60°, the sum of the currents $I_1+I_2+I_3$ is zero. To obtain a sequence, for example the second one, corresponding to the steady level 28 in FIG. 2a and to the steady levels 30 and 31 in FIGS. 2b and 2c respectively, the transistors 13 are controlled as shown in FIG. 1: the transistors $13_1$, $13_4$ and $13_6$ are conductive while the transistors $13_2$, $13_3$ and $13_5$ are off. The frequency and the phase of the currents $I_1$, $I_2$ and $I_3$, namely the instants of conduction of the various transistors, are determined by the position of the rotor of the motor 10 with respect to its stator, this position being measured by the sensor 23 and being given to the device 20 that controls said transistors.

In the variant represented by the graphs 3a, 3b and 3c, the currents $I_1$, $I_2$ and $I_3$ are also phase-shifted with respect to each other but, unlike in the previous example, at each sequence corresponding to a 60° rotation, only two phases are crossed by a current. Thus, between 0° and 60°, only the transistors $13_1$ and $13_4$ are conductive, the intensity $I_1$ therefore has a value +i, the intensity $I_2$ has the value –i and the intensity $I_3$ is zero. Between 60° and 120°, only the transistors $13_1$ and $13_6$ are conductive, the intensity $I_1$ is therefore equal to +i, the intensity $I_2$ is zero and the intensity $I_3$ is equal to –i.

The following sequences correspond to the following states of the transistors: between 120° and 180°, the transistors $13_3$ and $13_6$ are conductive; between 180° and 240°, the transistors $13_2$ and $13_3$ are conductive; between 240° and 300°, the transistors $13_2$ and $13_5$ are conductive and between 300° and 360°, it is the transistors $13_4$ and $13_5$ that let through current.

In this variant, each half-wave consists of a steady level 70 (FIG. 3c), with a duration of 120° during which the current flows, with steady levels 71 and 72 on either side, each having a 60° duration with the current having zero intensity during these steady levels.

To obtain the intensities i, –i and 2i, –2i of the steady levels 27, 28, 29, etc. (FIGS. 2a to 2c) or the intensities i and –i of the steady levels 70 (FIGS. 3 to 3c), during each sequence, a pulse width modulation (PWM) is used to command the conduction of the corresponding activated transistor. In the example, the pulse width modulation is at a frequency of 8 kHz. During each period of this 8 kHz signal, the cyclical ratio is equal to one half in order to obtain maximum intensity. This ratio ranges from zero to one half in order to obtain a lower intensity. Thus, during the second sequence shown in FIG. 1, the cyclical ratio of the high-frequency signal applied to the base of the transistor $13_1$ is equal to one half to obtain the steady level 28 while the cyclical ratios for the transistors $13_4$ and $13_6$ are equal to a quarter for the steady levels 30 and 31.

It can be easily understood that in steady operation, when the motor rotates, the various transistors are acted upon uniformly in the course of time.

By contrast, when the rotor is off, the transistors are constantly controlled in a non-uniform way. For example, if the sensor 23 indicates a position of the rotor such that the command must correspond to the steady levels 28, 30 and 31 (FIG. 2), only the transistors $13_1$, $13_4$ and $13_6$ are constantly conductive and the transistor $13_1$ is crossed by a current with an intensity that is twice that of the current going through the transistors $13_4$ and $13_6$. Thus, the transistor $13_1$, is constantly crossed by a current of maximum intensity. This transistor is therefore subjected to heating greater than the heating to which it is subjected in conditions of steady operation.

Although the transistors $13_3$ and $13_6$ are not crossed by a current of maximum intensity, they may nevertheless undergo excessive heating because they are constantly conductive.

Behavior similar to that of the turned-off rotor also occurs when starting up since, in this stage of operation, three transistors are acted upon for a longer period of time than the others.

Figure 3A:
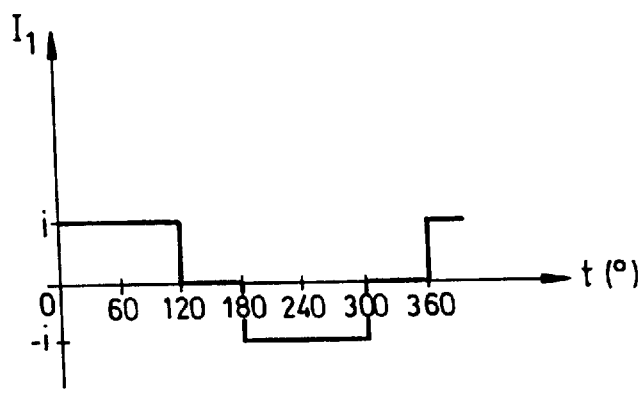
Figure 3B:
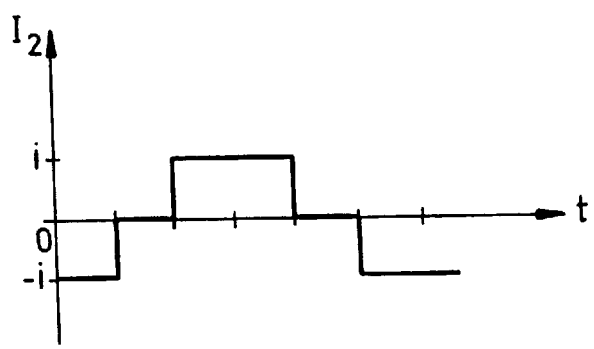
Figure 3C:
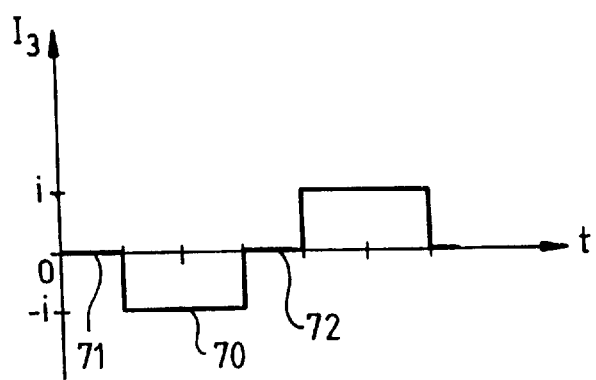

In the variant shown in FIG. 3, it is two transistors that are acted upon for a longer period of time than the others when starting up or when the rotor is off.

This greater action on at least one of the transistors may lead to the sizing of all the transistors in such a way that the heating of the transistors when starting up or when the rotor is off enables maximum torque when starting up. This approach would be costly. If the transistors, which are costly components whose price depends on the size, are not designed for steady operation, the torque characteristics when starting up are lowered, namely the torque is not the maximum when starting up.

To prevent excess sizing of the transistors (hence excess cost) or any lowering of the characteristics of the motor, it is provided, according to the invention, that when starting up or when the rotor is off, the control modulation of each transistor will be done at a frequency substantially below the frequency of the modulation in steady operation. If the modulation frequency (or chopping frequency) is 8 kHz under steady operation, then this modulation frequency when starting up will, in one example, be in the range of 1 kHz.

For, this reasoning is based on the observation that the losses in a transistor (or in another solid-state controlled switch) have two components: firstly, a conduction component and secondly a commutation component. The conduction losses are proportional to the intensity of the current flowing through the transistor and the commutation losses are proportional to the current, the voltage and the commutation frequency. These losses P thus correspond to the following formula:

$$P = K_1 I + K_2 I U f$$

In this formula, $K_1$ and $K_2$ are constant factors of proportionality, I is the intensity of the current flowing through the transistor, U is the voltage of the terminals of this same transistor and f is the commutation frequency, namely the frequency of the pulse width modulation in the present case.

It can be seen that if the frequency f diminishes, the losses P diminish.

In the preferred exemplary embodiment, the modulation frequency f' is chosen for the low speeds so that, with the rotor off or when starting up, the losses in a transistor are equal to the losses in steady operation at the frequency f.

In one example, this frequency f' is equal to 1 kHz while the frequency f in steady operation is 8 kHz. Naturally, the value of the frequency f' depends on $K_1$ and $K_2$, namely on the characteristics of the transistors.

It must be noted that the frequency of 8 kHz is chosen firstly so as to limit the current ripples and secondly so as not to prompt any sonic nuisance. Indeed, during the operation of the motor powered by the dc/ac inverter, it is only the harmonics higher than 2 that will give rise to vibrations of the greatest amplitude: these are therefore vibrations at non-audible frequencies.

By contrast, the frequency f' in the range of 1 kHz prompts audible vibrations. This property of the motor and its supply does not constitute a troublesome drawback. It may even be an advantageous feature for it generates a starting-up sound signal that is useful in certain circumstances.

To bring about a variation in the frequency of the pulse width modulation from f' to f, it is possible to proceed in various ways:

In a first embodiment, the frequency f', which is of a limited value, is applied only when starting up. Then, the value f is applied without transition.

In another embodiment, the command is such that the modulation frequency is made to vary from f' to f gradually for a specified time T.

In one variant, the frequency f is made to depend on the speed of rotation of the motor.

Figure 4:
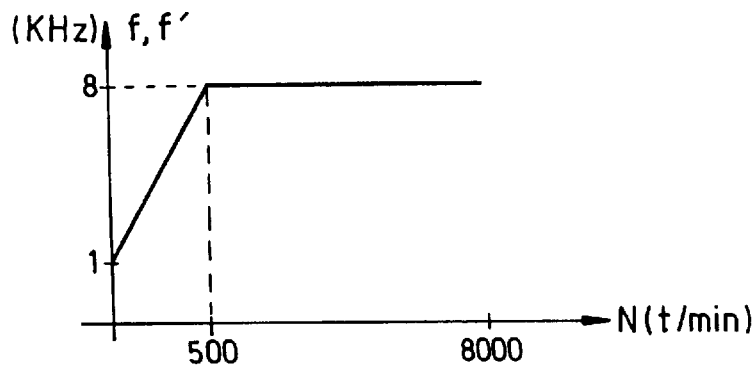
FIG. 4 is a graph showing a mode of implementation of the invention.

FIG. 4 is a graph in which the rotation speed N of the motor is plotted on the x-axis and the chopping frequency f, namely the pulse width modulation frequency, is plotted on the y-axis. In this example, the frequency f is controlled in such a way that it has a value of 1 kHz for a rotation speed equal to zero and gradually reaches the value of 8 kHz for a rotation speed in the range of 500 rpm.

Figure 5:
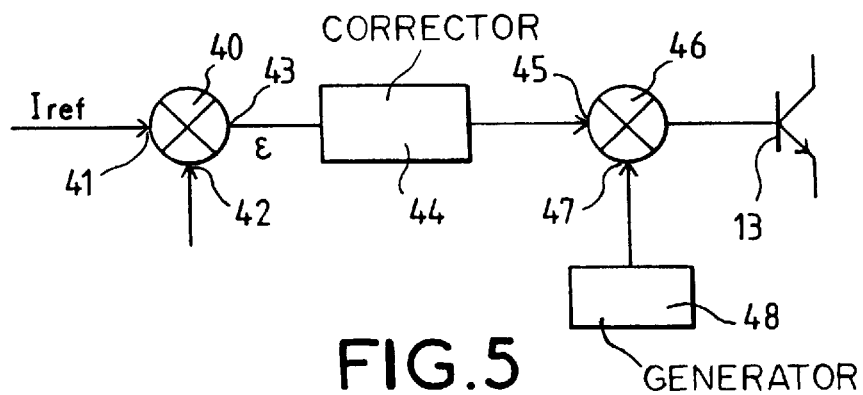
FIG. 5 is a drawing of an exemplary embodiment.

FIG. 5 is a drawing of an analog type circuit designed to control a transistor 13.

In this example, a first comparator 40 has one input 41 receiving a value $I_{ref}$ of the intensity of the desired current and a second input 42 receiving the value $I_{mes}$ of the intensity of the measured current. At output 43 of this comparator 40, there is obtained the difference ε between the inputs 41 and 42 and this input 43 is connected to the input 45 of another comparator 46 by means of a corrector device 44. The comparator 46 has a second input 47 connected to the output of a generator 48 delivering a signal with a variable frequency f. The output of the comparator 46 is connected to the base of a transistor 13.

Figure 6:
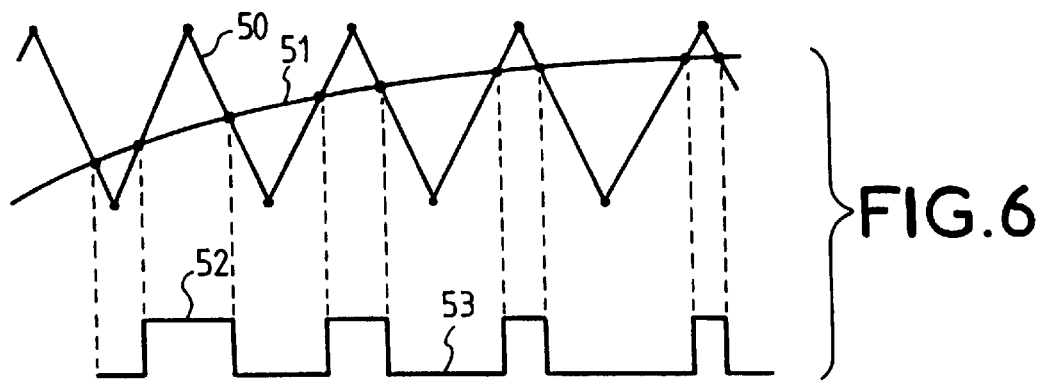
FIG. 6 is a graph showing the principle of operation of the circuit of FIG. 5.

The working of the circuit of FIG. 5 is presented by the graph of FIG. 6. In this graph, the triangular signal 50 given by the generator 48 with a variable frequency f is compared with the signal 51 at the output of the corrector 44. The output of the comparator 46 is in the "high" state 52 when the signal 50 has an amplitude greater than that of the signal 51 and conversely the output of the comparator 46 is in the "low" state 53 when the amplitude of the signal 50 is lower than the amplitude of the signal 51. Thus, to control the transistor 13, there is obtained a pulse width modulation at the frequency f of the triangular signal 50.

In one example, the maximum permissible losses for the transistors 13 are in the range of 300 watts and the frequency in steady operation is 8 kHz while the frequency when starting up is 1 kHz.

Although an analog type of embodiment has been described with reference to FIGS. 5 and 6, it goes without saying that a digital type of embodiment comes within the scope of the present description.

Figure 7:
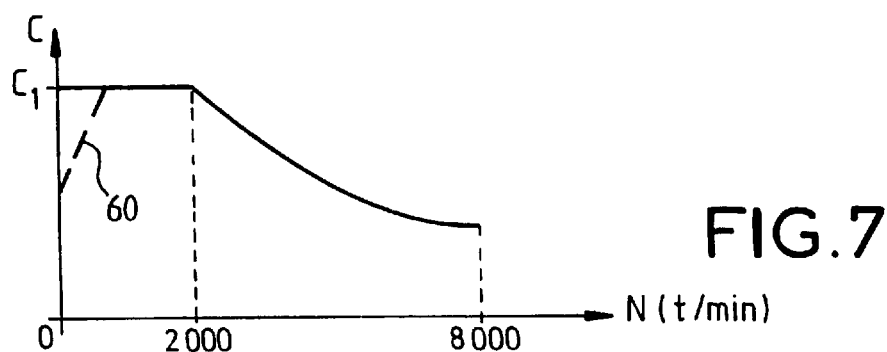
FIG. 7 is a graph showing the advantages of the invention.

FIG. 7 is a graph in which the rotation speed N of the motor is plotted on the x-axis and the torque C is plotted on the y-axis. The characteristic of the motor is such that the torque has a constant value C1 for speeds ranging from 0 to 2000 rpm. Then, the torque C diminishes up to 8000 rpm. It can be seen that, for the low speeds, from the starting-up point (zero speed) onward, the torque retains the maximum value C1. The curve 60, in dashes, represents the torque C that would be obtained if the frequency f of the pulse width modulation were to be maintained for the low speeds. It can thus be seen that a reduction of the torque when starting up would be obtained.

The invention is not limited to a synchronous motor supplied by a single dc/ac inverter. Thus, in one embodiment, the stator has a series of windings distributed around the rotor and each winding is supplied by one dc/ac inverter.

What is claimed is:

1. A dc/ac inverter for supplying alternating current to a stator of a rotating-field electrical motor, said dc/ac inverter comprising solid-state controlled switches delivering alternating currents to the stator, the intensity of each of the alternating currents, in the course of each half-wave, having successive sequences during each of which the intensity is substantially constant and determined by a cyclical ratio of a chopping signal controlling a conduction of each of the switches, wherein said inverter further comprises a means to give a frequency f of the chopping signal, a value f' at zero rotation speed of the rotor that is smaller than the chopping frequency for a rotation speed of the rotor that is different from zero.

2. A dc/ac inverter according to claim 1, wherein the chopping frequency f' at zero speed is chosen in such a way that the maximum losses of each controlled switch are, at zero speed, the same as in steady operation.

3. A dc/ac inverter according to claim 1 or 2, wherein the chopping frequency f' increases with the rotation speed of the motor.

4. A dc/ac inverter according to claim 3, wherein the chopping frequency f' increases with the speed of rotation N of the motor up till the first value, this frequency f being constant for the speeds of rotation higher than the first value.

5. A dc/ac inverter according to claim 3, wherein the chopping frequency increases during a determined time T.

6. A dc/ac inverter according to claim 1 wherein, with the chopping frequency f having, in steady operation, a value such that it produces inaudible vibrations, the value f' of this frequency at zero speed produces audible vibrations.

7. A dc/ac inverter according to claim 1, wherein the chopping frequency f, in steady operation, is in the range of 8 kHz.

8. A dc/ac inverter according to claim 1, wherein the chopping frequency at f' zero speed is in the range of 1 kHz.

9. A dc/ac inverter according to claim 1, wherein the controlled switches are transistors.

10. A dc/ac inverter according to claim 1 wherein, in each pair, the switches are series connected and the set of these two switches is at the terminals of a battery of accumulators, the control being such that, at each instant, only one switch is conductive in each pair and the intensity of the current in one of the phases is equal to twice the intensity of the current in the other two phases.

11. A dc/ac inverter according to claim 1 wherein, being designed for the supply of a synchronous motor, it comprises a sensor giving a signal on the position of the rotor with respect to the stator of the motor, this sensor controlling the sequence of operation of the controlled switches.

12. A dc/ac inverter according to claim 11 wherein the control is such that, at each instant, the frequency of the alternating current is kept at the value of synchronism of the motor.

13. An electrical vehicle comprising a synchronous type of traction motor, preferably with a rotor using permanent magnet or magnets, wherein said vehicle comprises a dc/ac inverter according to claim 1.

14. A vehicle according to claim 13, wherein the stator of the motor is of the three-phase type and wherein the dc/ac inverter comprises three pairs of controlled switches.

15. A dc/ac inverter according to claim 7, wherein the chopping frequency f' at zero speed is in the range of 1 kHz.

16. A dc/ac inverter according to claim 1, wherein the chopping signal frequency f' at zero rotation speed of the rotor is substantially smaller that the chopping frequency for a non-zero rotation speed of the rotor.

* * * * *